July 3, 1923.

B. V. EDWARDS

CONVEYING APPARATUS

Original Filed May 8, 1919

1,460,539

2 Sheets-Sheet 1

Inventor
Bruce V. Edwards
by Geyer & Topp
Attorneys

July 3, 1923.
B. V. EDWARDS
1,460,539
CONVEYING APPARATUS
Original Filed May 2, 1919  2 Sheets-Sheet 2
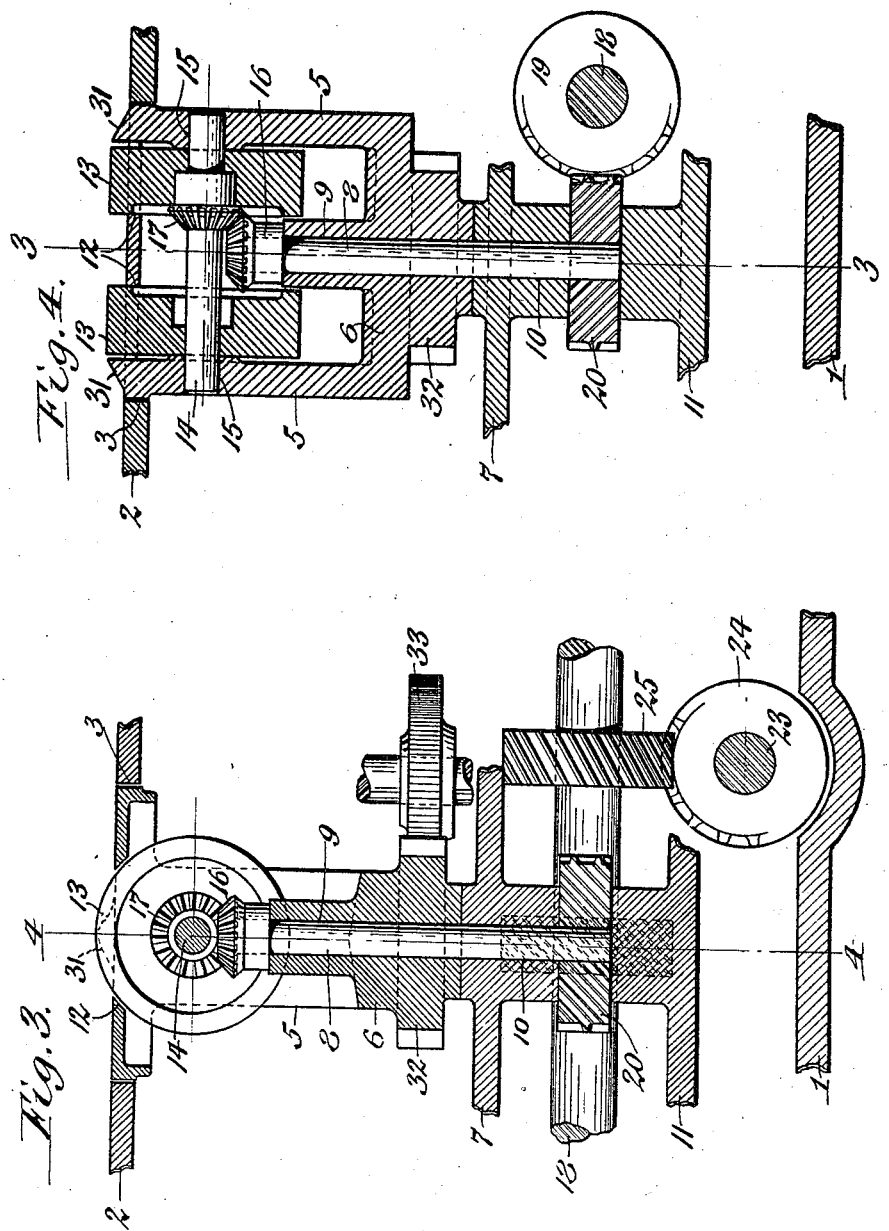

Patented July 3, 1923.

1,460,539

UNITED STATES PATENT OFFICE.

BRUCE V. EDWARDS, OF NEWARK, NEW JERSEY, ASSIGNOR TO WILLIAM L. LEARY, OF CHICAGO, ILLINOIS.

CONVEYING APPARATUS.

Application filed May 8, 1919, Serial No. 295,575. Renewed October 2, 1922. Serial No. 591,972.

*To all whom it may concern:*

Be it known that I, BRUCE V. EDWARDS, a citizen of the United States, residing at Newark, in the county of Essex and State of New Jersey, have invented new and useful Improvements in Conveying Apparatus, of which the following is a specification.

This invention relates to a turning conveyor which is more particularly designed for taking articles or loads of material which are being transported in one direction by one conveyor and turning the same preparatory to delivering the same to one or another of a plurality of other conveyors which are moving in different directions relatively to each other and thereby permit of distributing freight or similar material from one point where the same is loaded to differently located unloading points and places. Such turning conveyors are particularly useful in freight stations, and similar places, where a large amount of miscellaneous freight is distributed and which must be assorted either according to the character of the freight, its destination or the manner in which the same is to be shipped.

It is the object of this invention to provide a turning conveyor capable of accomplishing this purpose which is universal in its operation so as to permit a load to be transferred from a receiving line to a delivery line located at any angle with reference to each other and to accomplish this purpose by means which are comparatively simple in construction, efficient in operation, not liable to get out of order and capable of being operated by a minimum expenditure of power.

Figure 1:
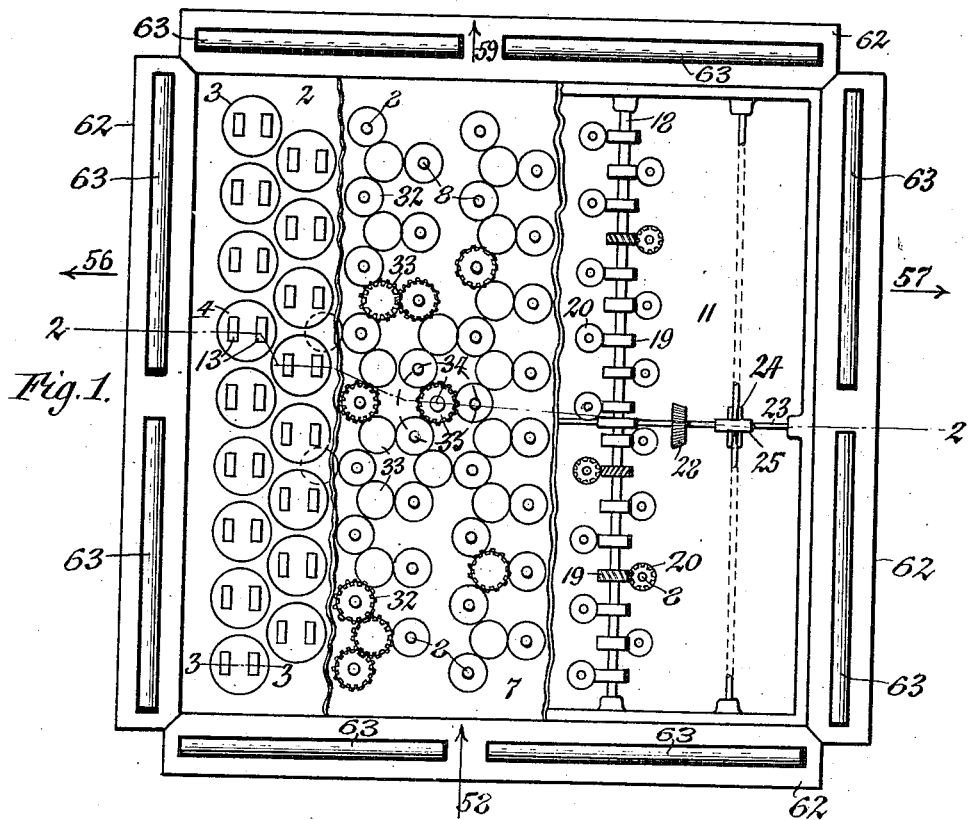
Figure 2:
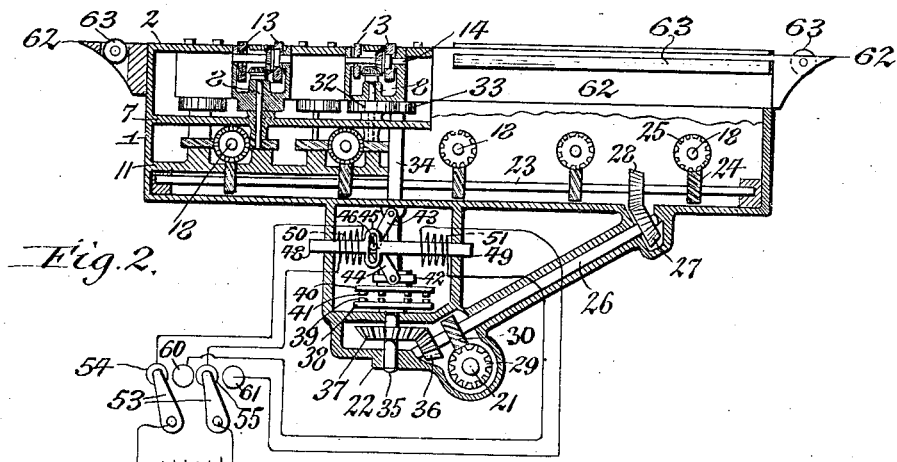

In the accompanying drawings:

Figure 1 is a diagrammatic top plan view of a turning conveyor embodying a practical form of my invention showing parts broken away for showing the internal mechanism. Figure 2 is a fragmentary vertical section taken on line 2—2, Fig. 1. Figure 3 is a fragmentary vertical section, on an enlarged scale, taken on line 3—3, Figs. 1 and 4. Figure 4 is a vertical section taken on line 4—4, Fig. 3.

Similar characters of reference refer to like parts throughout the several views.

The main frame of this turning conveyor is preferably constructed principally in the form of a rectangular box or hollow body 1 the horizontal top 2 of which forms the platform or table of the turning conveyor. In this platform are arranged a plurality of openings 3 which are preferably circular and the openings in one row being arranged midway between the openings in an adjacent row so that the several openings are staggered with reference to each other. Within each of these openings is arranged the circular top plate 4 of a turret which rotates about a vertical axis, this top plate having its upper side flush with the top of the platform and its peripheral edge arranged close to the bore of the respective platform opening so that the upper surfaces of the platform and the several turret plates are practically continuous.

Projecting downwardly from the underside of each of the turret plates on opposite sides of its center are two upright arms 5 which are connected at their lower ends by means of a cross piece 6. The latter together with these arms forms a yoke and constitutes with the top plate 4 a turret which is preferably formed integrally of cast metal. The lower end of this turret rests upon an upper horizontal web 7 arranged within the box of the main frame and forming part of the latter. Each of these turrets may be pivoted in any suitable manner but in the present instance this is accomplished by means of an upright shaft 8 which is journaled with its upper part within a vertical bearing 9 arranged concentrically on the cross bar on the turret, while the lower part of this shaft is journaled in a vertical bearing 10 arranged on the web 7 and its lower parts rest against an abutment formed on a lower horizontal web 11 which is arranged within the supporting box and forms part of the main frame, as best shown in Figs. 2, 3 and 4.

The top plate of each turret is provided with one or more openings or slots 12, preferably two, which are arranged on opposite sides of its axis and through these slots two supporting or conveying rollers 13 project so that the tops of these rollers are arranged slightly above the level of the turret plates and the conveyor platform, the lower parts of these rollers being arranged between the arms of the respective turret, as shown in Fig. 4. The members of each pair of these supporting rollers are arranged axially in line and secured to a horizontal driven shaft 14 which latter is journaled at its opposite ends in bearings 15 formed on the upper ends of the turret arms. Power is applied to the horizontal shaft and the supporting rollers connected therewith so that upon placing a box or other load upon these rollers the latter by their turning movement will cause the load to be propelled in a direction parallel with the plane of rotation of the supporting rollers. The means for rotating these supporting rollers may be varied as to details of construction but this is preferably accomplished by means which comprise a driving bevel gear 16 secured to the upper end of the driving shaft 8 and meshing with a driven bevel gear 17 secured to the horizontal driven shaft 14 as shown in Figs. 2, 3 and 4. The vertical shafts 8 of one row of turrets are preferably operated in unison by means which include a horizontal distributing shaft 18 journaled in suitable bearings on the main frame between the upper and lower webs 7 and 11 and provided with a plurality of driving spiral gear wheels 19 each of which meshes with a driven spiral gear wheel 20 secured on the lower end of one of the vertical turret shafts between the opposing upper side of the lower web and the underside of the upper web.

Although power may be transmitted to the several distributing shafts in any suitable way and from any suitable source this power in the present instance, is preferably derived from a main driving shaft 21 which is journaled horizontally in an extension 22 on the underside of the body of the frame. The means which are preferably employed for transmitting motion from this main driving shaft to the several distributing shafts comprise a horizontal counter shaft 23 journaled in the lower part of the frame box and at right angles to the distributing shafts and provided with a plurality of driving spiral gear wheels 24 each of which meshes with a driven spiral gear wheel 25 on one of the distributing shafts, an inclined intermediate shaft 26 journaled in suitable bearings on the main frame, a pair of intermeshing beveled gear wheels 27, 28 connected respectively with the upper end of the inclined shaft and the adjacent part of the counter shaft 23 and a pair of intermeshing spiral gear wheels 29, 30 connected respectively with the main driving shaft and the inclined schaft, as shown in Fig. 2. This driving mechanism operates to transmit power from the main driving shaft to the pairs of supporting rollers on the several turrets so that these rollers turn simultaneously at the same rate of speed and therefore operate to uniformly transport a load resting on the same.

In order to prevent any article or load which is being pushed over these rollers from accidentally striking the side of the same and injuring them, in the event that the line of approach is at an angle to the side of the rollers, the top plate of each turret is provided adjacent to the outer sides of the supporting rollers with inclined fenders or guiding projections 31 which extend from the upper side of each supporting plate to the top of the supporting rollers as best shown in Fig. 4, thereby causing the object which strikes these guides to be deflected to the top of the supporting roller end and avoid injuring the latter by a side blow.

In order to cause the article or freight to be turned from one line of movement in one direction to another line of movement in another direction all of the several turrets are operatively connected so that they will be turned in unison by an adjusting mechanism which may be operated either by power or otherwise. For this purpose each of the turrets is provided on its lower part with a driven gear wheel 32 and a plurality of intermediate driving gear wheels 33 are provided each of which meshes on its opposite sides with the driven gear wheels of adjacent turrets so as to cause all of the turrets to turn simultaneously in one direction or the other in unison. The axes of the horizontal shafts 14 and supporting rollers are always parallel with each other in the various positions in which the turrets may be turned. One of these intermediate driving gear wheels 33, preferably one arranged in the central part of the group, may be taken as the master gear wheel, and this wheel is secured to the upper end of a main or master adjusting shaft 34 which is journaled in an upright position in suitable bearings on the main frame. This master shaft may be turned by any suitable means for shifting the turrets into the desired position and causing the supporting rollers thereon to be arranged at the desired angle for shifting the freight resting thereon from one direction line to another. The means shown in the drawings for adjusting the several turrets are so organized that they are operated by power and controlled by an electrical clutch, which means, as shown in Fig. 2 are preferably constructed as follows:

35 represents a lower clutch shaft journaled in suitable bearings in the lower part of the main frame vertically in line with the master shaft 34 and rotated continuously by means of a bevel gear wheel 36 secured to the inclined shaft 26 and meshing with a bevel gear wheel 37 on the clutch shaft 35. On its upper end the clutch shaft is provided with a driving clutch disk 38 the upper side of which is provided with a plurality of clutch jaws or teeth 39 arranged in the annular row. 40 represents a driven clutch disk mounted on the lower end of the master shaft 34 by means of a spline so as to be capable of sliding vertically thereon but compelled to turn therewith. On its underside this driven clutch disk is provided with an annular row of clutch teeth 41 which are adapted to engage with the teeth of the driving clutch disk when lowering the driven disk or to be uncoupled therefrom when raising the driven disk. This raising and lowering of the upper driven disk may be effected by a variety of means, for instance by a shifting ring 42 engaging loosely with an annular groove in the hub of the driven clutch disk, a pair of toggle links 43, 44 which have their opposing ends pivotally connected with each other while the outer end of one link is connected with the adjacent part of the frame and the outer end of the other link is connected with the clutch ring, a yoke 45 having a vertical slot which receives a pin 46 on the yoke, and two solenoid cores 48, 49 which are arranged respectively within the coils 50, 51 of two solenoid electro magnets. Upon passing a current of electricity through coil 51 so as to energize the same the core 49 therein will be drawn lengthwise in one direction and cause the toggle links to straighten and move the driven clutch disk toward the lower clutch disk so as to couple the clutch shaft with the master shaft while upon energizing the other coil 50 the core 48 and associated parts will be moved in the opposite direction and the clutch will be uncoupled. Suitable means for thus alternately directing the electric current from a source of supply 52 to either one of the coils are shown in Fig. 2 and comprises a double switch 53 the movable members of which are connected with the terminals of the electric source and are adapted to be engaged either with a pair of contacts 54, 55 forming the terminals of one coil or with a pair of contacts 60, 61 forming the terminals of the other coil.

By this means the operator upon closing the switch through the proper coil can turn the central turrets until they have been adjusted to the desired position and then disconnect the shifting mechanism from these turrets so that the latter remain in the adjusted position. While the turrets are in one position the freight delivered upon the several supporting wheels from one line of approach will be turned and discharged in a different direction along another line of movement in accordance with the predetermined wish of the operator. As shown in the drawings the platform is of rectangular form and the turning mechanism is so organized that freight matter can be taken on at any one of its four sides and delivered at one or another of the remaining three sides by simply adjusting the several turrets so that the supporting wheels thereof are arranged at the proper angle to propel the freight from one line to another. For instance, if the freight is supplied by a carrier which approaches on that side of the turning conveyor indicated by the arrow 58 in Fig. 1, and the turrets are arranged in the position in this figure so that the axes of the supporting rollers are arranged at right angles to the supply line, then the freight will simply continue in its movement across the platform of the turning conveyor and be delivered in the same direction from the opposite side of the platform indicated by the arrow 59 in Fig. 1. If however, it is desired to transfer the freight from the line of approach indicated by the arrow 58 to either one of the lateral sides of the platform indicated by arrows 56, 57 in Fig. 1, then the several turrets are adjusted so that the axes of the supporting rollers are all arranged parallel with the line of approach and at right angles to the line of delivery, thereby causing the freight as it is delivered by the supply line to the platform to be immediately taken by the supporting rollers and discharged by the same to one or the other of the discharge lines on one or other lateral side of the platform depending upon whichever way the supporting rollers are turning at this time.

In order to facilitate the delivery of freight onto the platform and the discharge therefrom on all sides thereof, each of the several sides of the platform is provided with a transfer bridge 62 upon which are mounted several anti-friction rollers 63 which are arranged cross wise of the particular line of travel and thus facilitate the movement of any freight which may be deposited upon the same.

This turning conveyor is capable of being operated automatically from a distance by arranging the controlling mechanism adjacent to the place where the dispatcher of the freight is located, thereby permitting freight to be discharged to remote points from the place where it is loaded on to the conveyor without requiring any manual work for this purpose or the assistance of any additional attendants, thereby rendering it possible to distribute freight much more economically and rapidly than has been possible heretofore.

I claim as my invention:

1. A turning conveyor comprising a turret turning about a vertical axis, and a supporting roller pivoted on said turret to turn about a horizontal axis, means for adjusting said turret, and means for rotating said roller.

2. A turning conveyor comprising a turret pivoted to turn about a vertical axis, a supporting roller journaled on said turret to turn about a horizontal axis, means for rotating said roller comprising a driven bevel gear connected with said roller, and a driving shaft journaled concentrically relatively to said turret and provided with a driving bevel gear meshing with said driven bevel gear, and means for rotating said turret.

3. A turning conveyor comprising a turret pivoted to turn about a vertical axis, a supporting roller journaled on said turret to turn about a horizontal axis, means for rotating said roller comprising a driven bevel gear connected with said roller, and a driving shaft journaled concentrically relatively to said turret and provided with a driving bevel gear meshing with said driven bevel gear, and means for rotating said turret, comprising a driven gear wheel arranged on said turret, and a driving gear wheel meshing with said driven gear wheel.

4. A turning conveyor comprising a turret turning about a vertical axis, a driven shaft journaled horizontally on said turret, two supporting rollers secured to said driven shaft, a driven bevel gear secured to said driven shaft, and a driving shaft journaled concentrically relatively to said turret and provided with a driving bevel gear meshing with said driven bevel gear.

5. A turning conveyor comprising a turret turning about a vertical axis, a driven shaft journaled horizontally on said turret, two supporting rollers secured to said driven shaft, a driven bevel gear secured to said driven shaft, a driving shaft journaled concentrically relatively to said turret and provided with a driving bevel gear meshing with said driven bevel gear, a driven spiral gear secured to said vertical shaft, and a shaft provided with a driving spiral gear wheel meshing with said driven spiral gear wheel.

6. A turning conveyor comprising a turret rotatable about a vertical axis and having a horizontal top plate provided with a slot and a lower yoke, a driven shaft journaled horizontally in the upper part of said yoke and provided with a driven bevel gear, a supporting roller mounted on said horizontal shaft and projecting through said slot, and a vertical driving shaft journaled in the lower part of said yoke and concentrically relatively thereto and provided with a driving bevel gear which meshes with said driven bevel gear.

7. A turning conveyor comprising a turret rotatable about a vertical axis and having a horizontal top plate provided with a slot, and a lower yoke, a driven shaft journaled horizontally in the upper part of said yoke and provided with a driven bevel gear, a supporting roller mounted on said horizontal shaft and projecting through said slot, a vertical driving shaft journaled in the lower part of said yoke and concentrically relating thereto and provided with a driving bevel gear which meshes with said driven bevel gear, and a platform provided with an opening which receives said top plate.

8. A turning conveyor comprising a plurality of turrets arranged side by side and each adapted to turn about a vertical axis, a plurality of supporting rollers each mounted on one of said turrets to turn about a horizontal axis, and means for simultaneously turning said turrets and maintaining said supporting rollers in parallelism.

9. A turning conveyor comprising a plurality of turrets arranged side by side and each adapted to turn about a vertical axis, a plurality of supporting rollers each mounted on one of said turrets to turn about a horizontal axis, and means for simultaneously turning said turrets and maintaining said supporting rollers in parallelism comprising a driven gear wheel arranged on each turret, a plurality of idle intermediate gear wheels each of which meshes with a pair of adjacent driven gear wheels, and a driving shaft connected with one of said gear wheels.

10. A turning conveyor comprising a plurality of turrets arranged side by side and each adapted to turn about a vertical axis, a plurality of supporting rollers each mounted on one of said turrets to turn about a horizontal axis, and means for simultaneously turning said turrets and maintaining said supporting rollers in parallelism comprising a driven gear wheel arranged on each turret, a plurality of idle intermediate gear wheels each of which meshes with a pair of adjacent driven gear wheels, a driving shaft connected with one of said gear wheels, a constantly rotating power wheel, and a clutch for connecting and disconnecting said driving shaft and power wheel.

11. A turning conveyor comprising a plurality of turrets arranged side by side and each adapted to turn about a vertical axis, a plurality of supporting rollers each mounted on one of said turrets to turn about a horizontal axis, and means for simultaneously turning said turrets and maintaining said supporting rollers in parallelism comprising a driven gear wheel arranged on each turret, a plurality of idle intermediate gear wheels each of which meshes with a pair of adjacent driven gear wheels, a driving shaft connected with one of said gear wheels, a constantly rotating power wheel, a clutch for connecting and disconnecting said driving shaft and power wheel, and a main shaft operatively connected with said vertical shafts and supporting rollers.

BRUCE V. EDWARDS.

Witness:

FRANK W. FURREY.